US011215590B2

(12) United States Patent
McPartland et al.

(10) Patent No.: US 11,215,590 B2
(45) Date of Patent: Jan. 4, 2022

(54) LARGE VOLUME GAS CHROMATOGRAPHY INJECTION PORT

(71) Applicant: MLS ACQ, Inc., East Windsor, CT (US)

(72) Inventors: Kelly Renee McPartland, West Hartford, CT (US); Martin L. Spartz, Ellington, CT (US)

(73) Assignee: MLS ACQ, INC., East Windsor, CT (US)

(*) Notice: Subject to any disclaimer, the term of this patent is extended or adjusted under 35 U.S.C. 154(b) by 444 days.

(21) Appl. No.: 16/115,732

(22) Filed: Aug. 29, 2018

(65) Prior Publication Data

US 2019/0064127 A1 Feb. 28, 2019

Related U.S. Application Data

(60) Provisional application No. 62/554,350, filed on Sep. 5, 2017, provisional application No. 62/551,590, filed on Aug. 29, 2017.

(51) Int. Cl.
*G01N 30/20* (2006.01)
*G01N 30/12* (2006.01)
(Continued)

(52) U.S. Cl.
CPC ................ *G01N 30/74* (2013.01); *G01J 3/42* (2013.01); *G01N 21/3504* (2013.01); *G01N 30/12* (2013.01); *G01N 30/16* (2013.01); *G01N 30/20* (2013.01); *G01N 30/30* (2013.01); *G01N 30/32* (2013.01); *G01N 30/40* (2013.01); *G01N 30/7206* (2013.01); *G01N 2021/3595* (2013.01); *G01N 2030/008* (2013.01); *G01N 2030/025* (2013.01); *G01N 2030/121* (2013.01); *G01N 2030/128* (2013.01); *G01N 2030/328* (2013.01);
(Continued)

(58) Field of Classification Search
CPC ........ G01N 30/74; G01N 30/16; G01N 30/30; G01N 30/20; G01N 30/12; G01N 30/40; G01N 30/32; G01N 30/7206; G01N 2030/128; G01N 2030/328; G01N 21/3504; G01N 2021/3595; G01N 2030/402; G01N 2030/121; G01N 2030/008; G01N 2030/025; G01N 2030/743; G01J 3/18; G01J 3/42
See application file for complete search history.

(56) References Cited

U.S. PATENT DOCUMENTS 9,606,088 B2 3/2017 Spartz et al.
10,690,636 B2 * 6/2020 Ruppel .................. G01N 30/14
(Continued)

*Primary Examiner* — Suman K Nath
(74) *Attorney, Agent, or Firm* — HoustonHogle LLP

(57) ABSTRACT

A method and system for sample analysis involve a temporally-resolving separation of sample components. In the method, solvent vapors are condensed prior to entering a temporally-resolving separator, a GC column, for example, and solvent-depleted vapors are directed to the separator where constituents are resolved in time. A system for analyzing a sample comprises an injection port, a temporally-resolving separator (e.g., a GC column) and a conduit connecting the two. The injection port is at a temperature sufficiently high to vaporize the solvent and analytes present in a sample. The conduit is configured and/or operated to condense the solvent, while maintaining the analytes in the vapor phase.

26 Claims, 10 Drawing Sheets

(51) Int. Cl.

| | |
|---|---|
| ***G01N 30/74*** | (2006.01) |
| ***G01N 30/30*** | (2006.01) |
| ***G01J 3/42*** | (2006.01) |
| ***G01N 30/40*** | (2006.01) |
| ***G01N 30/32*** | (2006.01) |
| ***G01N 30/72*** | (2006.01) |
| ***G01N 21/3504*** | (2014.01) |
| ***G01N 30/16*** | (2006.01) |
| *G01N 21/35* | (2014.01) |
| *G01N 30/00* | (2006.01) |
| *G01N 30/02* | (2006.01) |

(52) U.S. Cl.

CPC . *G01N 2030/402* (2013.01); *G01N 2030/743* (2013.01)

(56) References Cited

U.S. PATENT DOCUMENTS

| | | | | |
|---|---|---|---|---|
| 2012/0022193 | A1* | 1/2012 | Zilberman ................ | C07F 9/12 524/127 |
| 2017/0122920 | A1* | 5/2017 | Spartz .................... | G01N 30/20 |

* cited by examiner

System layout: Liquid injection port with manual vacuum backflush

System layout: Liquid injection port with automated vacuum backflush

System layout: Liquid injection port with automated vacuum flush on transfer line System layout: TDT injection port with automated vacuum flush on transfer line System layout: Liquid injection port with automated vacuum backflush and check valve System layout: Liquid injection port with high pressure flush

LARGE VOLUME GAS CHROMATOGRAPHY INJECTION PORT

RELATED APPLICATIONS

This application claims the benefit under 35 USC 119(e) of U.S. Provisional Patent Application No. 62/554,350, with the title Large Volume Gas Chromatography Injection Port, filed on Sep. 5, 2017 and U.S. Provisional Patent Application No. 62/551,590, with the title Large Volume Gas Chromatography Injection Port, filed on Aug. 29, 2017, both of which are incorporated herein by reference in their entirety.

BACKGROUND OF THE INVENTION

Gas chromatography (GC) is an analytical method that measures the content of various components in a sample. The method for separating chemical substances relies on differences in partitioning behavior between a flowing mobile phase (gas phase) and a stationary phase supported in a column to separate the components in a mixture. As the gas flow passes through the column, the sample components move at velocities that are influenced by the degree of interaction of each component with the stationary phase in the column. Consequently, the different components separate in time as the components elute from the column.

While GC is widely used to resolve a mixture into its various components according to retention profiles of the different molecules passing through the GC column, and can potentially handle mixtures containing large numbers (hundreds, for instance) of substances, identifying the molecules that elute from the column is more problematic. For example, full peak separation is often needed to qualify and quantify the compounds present. Small sample sizes and dynamic ranges, and the need for continuing calibration are additional drawbacks.

To address the need for rapid and sensitive identification of the molecular species present, GC has been integrated with techniques such as mass spectrometry (MS) or Fourier transform infrared (FTIR) spectrometry.

Gas chromatography-mass spectrometry (GC-MS) is probably the most widespread tandem technique in the analytical instrumentation industry today. GC-MS systems are versatile and are employed across many different industries, particularly for environmental, chemical, petroleum, pharmaceutical, and toxicological applications. While GC-MS is a fast, sensitive technique suitable for multiple component detection and spectral identification, capable of measuring atomic species and supported by large available spectral libraries, it suffers from some disadvantages. These include compound separation to prevent MS interferences, non-linear calibrations, poor precision and accuracy (requiring constant calibration) and limited dynamic range. Problems also are encountered when high concentrations are present that can allow for chemical ionization to occur, generating questionable data.

While GC-MS is the more commonly deployed solution, Gas Chromatography-Fourier Transform Infrared Spectrometry (GC-FTIR) provides a powerful analytical tool that is particularly useful to distinguish among structural isomers that have identical electron impact and chemical ionization mass spectra.

Nevertheless, historically the designs of GC-FTIR systems have been plagued with their own limitations. For example, many GC-FTIR sample cells utilize a "light pipe" (typically a cell or cuvette used for passing both gas eluted from the GC column, and light from the FTIR interferometer). The light pipe is made relatively short to prevent peak dilution through the IR cell and its eventual IR detection or secondary detection. Since IR absorption is proportional to cell path length, this short path length limits the sensitivity (minimum detection limit (MDL)) of the technique. Problems also arise in cases in which GC peaks come off very quickly. Since the light pipe has a relatively large volume when compared to the flow rates of the GC, the gas can become diluted, making measurements more difficult.

More recently, Spartz, et al., in U.S. Pat. Appl. Pub. No. US 2015-0260695 A1, now U.S. Pat. No. 9,606,088, issued Mar. 28, 2017, and in U.S. Pat. Appl. Pub. No. US 2017-0122920 A1, all of which are incorporated herein by this reference in their entirety, disclose GC-FTIR techniques and systems with the objective of coupling existing or newly developed approaches, such as GCs, and/or optical spectroscopy systems (e.g., FTIRs) in ways that reduce or minimize the deficiencies encountered with conventional arrangements.

SUMMARY OF THE INVENTION

It is often necessary to analyze samples containing large amounts of solvents. Often, the sample of interest is a water sample that may also include contaminants or impurities, one or more volatile organic compounds (VOCs), for example.

Large amounts of water can obscure analyte peaks in GC analyses. For certain combined approaches, (such as GC-FTIR systems), water present in the sample can cause significant optical interferences for benzene, toluene, and other compounds.

In current practice, high solvent levels typically affect the size of the sample injected into a GC instrument. Since large amounts of sample can contain large amounts of solvent that need to pass through the GC column, leading to poor chromatography, GC systems typically use small injection samples, of the order of 1 microliter (μL), for instance. While a small sample size reduces the amount of solvent handled by the GC column, it also reduces analyte amounts, posing increased difficulties in detecting compounds that are only present at trace levels. A further reduction can occur by splitting the sample at the injection port. If a larger sample were to be used, the split ratio would also be increased to reduce the amount of material making it to the column.

Other approaches for handling samples that contain large amounts of solvent, such as, for instance, water samples, involve purge and trap techniques. These techniques function by sparging the solvent or liquid (normally water) with carrier gas or $N_2$. The sparging generates tiny bubbles that produce micro-extractions of the chemical contaminants like VOCs from the water. The VOCs are then trapped on a sorbent trap. This can then be injected into the GC directly, through a split injection, passed to secondary trap to remove moisture and further focus the VOCs or analytes of interest, and are then injected on to the GC. Issues with purge and trap include the extraction efficiency. For a solvent such as water, the more polar the analyte molecules, the less analyte material can be extracted, since the material preferentially would "like" to remain in the like solvent. Also affected is the trapping efficiency of the sorbent, once the compounds are released. By injecting water or solvent directly both of these issues are eliminated.

While aimed at accumulating increased amounts of analytes, purge and trap approaches require added equipment (often using not just one but two traps, along with associated operating devices and manifolds) that can be cumbersome and/or expensive. Often available as a stand-alone component to be attached to the GC system, purge and trap glassware can become contaminated or contribute to sample losses, preventing analytes from reaching the GC.

A need exists, therefore, for techniques that address these and other problems encountered with the existing technology. For instance, there is a need for detecting trace amounts of impurities (contaminants) in samples that are predominantly composed of solvent, water samples, for example; for handling significant amounts of water (or other solvent) present on thermal desorption devices; and/or for GC injections of larger and often considerably larger volumes of solvent without obscuring analyte signal.

In one of its aspects, the invention features a method for sample analysis. In the method, solvent vapors are condensed prior to entering a temporally-resolving separator, thereby producing a solvent-depleted vapor component that is directed to and through the separator. An example of a separator that can resolve sample components in time is or includes a CG column. The present method can be incorporated in sample analysis approaches that rely solely on GC as well as those that combine GC with mass or with optical spectrometry. Other temporally-resolving separators can be employed, as known or as developed in the art. Some are described in U.S. Pat. No. 9,606,088, for example.

In another of its aspects, the invention features a system comprising an injection port, a temporally-resolving separator (e.g., a GC column) and a conduit connecting the two. The injection port is at a temperature sufficiently high to maintain the solvent and analytes present in a sample in the vapor phase. The conduit is configured to condense the solvent, e.g., on inner conduit surfaces, while maintaining analytes in the vapor phase. In a specific example, the conduit is cooled to a temperature below the injection point and often cooled to a temperature sufficient to condense the solvent. Other parameters that can be considered, alternatively or in addition, include but are not limited to conduit length and a decreasing conduit cross section. The system can further include means for cooling and/or heating and/or stabilizing the temperature of the conduit. Some implementations provide an arrangement for removing condensed solvent from the conduit.

Embodiments described herein are widely applicable and can be practiced with direct injection, thermal desorption devices, various temporally resolving separators, including but not limited to GC, and any number of detection techniques.

Easy to implement, features of the invention can be incorporated or adapted to newly designed or existing GC equipment. In contrast to many current approaches, in which the injection port is configured for sample splitting (to allow the injection of larger sample volumes), the invention can be practiced in the absence of sample splitting, while still presenting improved sensitivities.

Generally, the large sample volumes possible do not affect the chromatographic analysis to any significant degree. Rather they result in higher analyte amounts, facilitating analyte detection. While conventional injection volumes rarely exceed 1 microliter (μL), to keep solvent at manageable levels, the invention can be practiced with injection volumes that are much larger, such as 1 milliliter (mL), for example. Injection of a 1 mL sample, and potentially more, far exceeds the volumes typical of today's chromatography.

In some cases, the chromatography is, in fact, improved, in particular during the early elution of the solvent, reducing elution times that normally could take several minutes to considerably shorter time intervals, e.g., lasting a minute or less.

For cases in which sample collection involves a thermal desorption device, the volumes trapped can be substantially higher than those previously thought possible, resulting in higher analyte levels ultimately passing through the GC column and the detection system employed.

Practicing the invention in the context of purge and trap approaches can eliminate the need for a second trap, thereby circumventing drawbacks caused by the need to vaporize all the VOCs, trapping them without loss (on the second trap) and then desorbing them into the GC column in a narrow plug.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
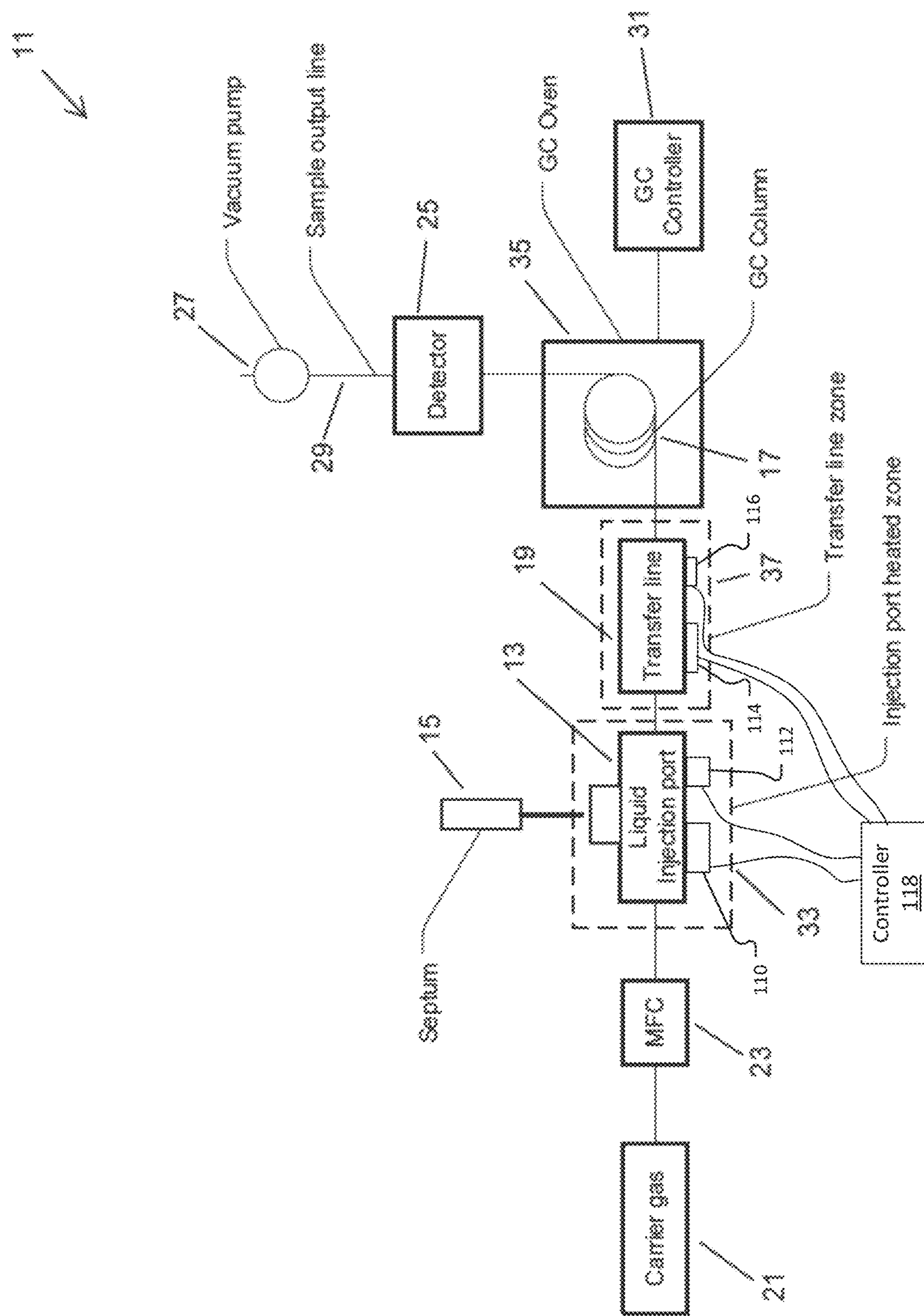
FIG. 1 is a schematic diagram of one arrangement that can be used to practice embodiments of the invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

The invention generally relates to approaches for handling large volumes of solvent without affecting (to any significant degree) the chromatographic analysis of contaminants or impurities present in the sample. In many contexts, these contaminants as well as any other sample materials being investigated are known as "analytes" and, as used herein, this term refers to one or more sample constituents other than the solvent. Often, the sample contains only trace amounts of analytes, e.g., at parts per million (ppm) or even parts per billion (ppb) concentrations. In specific embodiments, these analytes are VOCs, e.g., benzene, toluene, other aromatic and aliphatic hydrocarbons, chlorinated and fluorinated hydrocarbons, ethers, esters, sulfides, and so forth.

Aspects of the invention can be practiced with any number of solvents. As used herein, the term "solvent" describes a single compound or a mixture of compounds. In one specific example, the solvent is or contains water. In other examples the solvent comprises, consists essentially of or consists of one or more high boiling compound(s), similar to the boiling point of water. In a typical analysis, the solvent often represents the overwhelming bulk of the sample. For instance, the solvent can be present in the sample in an amount of 99 volume % or more.

Samples can be derived from a stack or process gas or stream often found in industrial operations. In some cases, the sample is collected onto a concentrating device such as a cold or cryo trap, a thermal desorption tube (TDT) or another suitable apparatus. Embodiments described herein also can be practiced by sampling an aqueous solution being introduced by direct injection to an injection port, when off gassing a material containing the solvent, and so forth.

The sample is analyzed using a temporally-resolving separator. In many implementations, some or all the sample components are separated in time by GC techniques.

In general, a GC uses a stationary phase, which is typically a microscopic layer of liquid or polymer on an inert solid glass or metal tube, i.e., a column. The mobile phase is a carrier gas, usually an inert gas such as helium or a non-reactive gas such as nitrogen. The carrier gas flow is controlled by flow controllers and/or a series of valves to maintain or vary the flow rate during the separation. The flow controllers and valves can also be used to allow the entire sample or a fraction of the sample to enter the column. The column is located in an oven where the temperature of the gas passing through the column can be controlled. The compounds (in vapor or gaseous form) interact with the walls of the column or stationary phase, causing each compound to elute at a different time, known as the retention time of the compound.

Carrier gases that can be used include nitrogen ($N_2$), for instance ultra high purity (UHP) $N_2$, or another suitable gas or gas mixture, as known in the art or as developed for specific implementations.

Many GC instruments are provided with a standard high temperature septum injection port capable of completely vaporizing the solvent. Traditionally, once vaporized, the sample, including both the solvent and the analytes, enters the GC column in the gaseous phase. In conventional arrangements, this is often accomplished by maintaining the injection port and any connecting elements located between the GC injection port and the inlet of the GC column at a sufficiently high temperature.

Shown in FIG. 1, is apparatus 11, including liquid injection port 13, provided with septum 15, and GC column 17. Transfer line 19 connects the two. A carrier gas can be supplied from source 21, its flow being regulated by mass flow controller (MFC) 23. Output from GC column 17 is measured by detector 25 and evacuated from the system using vacuum pump 27 located on output line 29. Operation of apparatus 11 is controlled by controller 31, provided with computer hardware, software, libraries, interfaces, display devices and/or other elements, as known in the art or as developed or adapted to specific instrumentation.

To vaporize the liquid sample, injection port 13 is heated in zone in zone 33. To maintain analytes in the gaseous phase, GC column 17 is heated by oven 35. Other suitable approaches utilize resistively heated columns that have enclosures around them to maintain the desired temperature. The temperature of transfer line 19 is regulated in transfer line zone 37. In a conventional approach, zone 37 is a heating zone, maintaining the transfer line at a temperature sufficiently high to keep both solvent and analytes in the gaseous phase as they are directed to GC column 17.

According to arrangements and methods described herein, the solvent is preferentially condensed and retained upstream of the GC column (or another time-resolving separator), while analytes (typically present at levels considerably lower than those of the solvent) proceed to and through the column as vapors. In one implementation and in contrast to conventional approaches, the transfer line (also referred to herein as "conduit") that leads the sample from injection port to the GC column is held at a temperature that is not high enough to keep the solvent completely in the vapor phase. Rather, it is kept at a lower temperature, typically a temperature at which the solvent will condense. For instance, the conduit temperature can be lowered to 70%, 60%, 50%, 40%, 30%, 20% or to another suitable level relative to the temperature of the injection port. The conduit can be cooled by a suitable technique such as, for example, cooling media, fans, heat exchangers, thermoelectric (TE) devices, based on the Peltier effect, etc. In some cases, the temperature drop simply relies on the ambient (room) temperature.

In addition, or alternatively, the transfer line is designed to enhance solvent condensation. Factors that can be considered include but are not limited to: transfer line materials, diameter, length, etc.

The transfer can be made of metal (e.g., stainless steel) or another suitable material. It can be straight or nearly so, coiled, in the form of corrugated tubing or in any other suitable configuration. The length can be selected to increase the pathway travelled by the sample (allowing added room for condensation). Alternatively of in addition, the conduit can be configured to have an inner diameter that changes one or more times to provide a drop from a wider cross-section to a narrower one.

In one embodiment, a controller 118 is used to control the temperature of the injection port 13 and the transfer line 19 to respective, individually set, temperatures to ensure the vaporization of the solvent in the injection port and its condensation in the transfer line.

In the illustrated embodiment, an injection port heater 110, such a resistive tape, is energized by the controller 118. An injection port temperature detector 112 detects the temperature of the injection port. Thus, the controller 118 employs feedback control to maintain the injection port 13 at the desired, set temperature, which is usually set by the operator based on their understanding of the solvent, and the temperature at which it vaporizes.

In a similar vein, a transfer line heater and/or cooling system 114, such resistive tape or a thermoelectric heater/cooler, is also energized by the controller 118. A transfer line temperature detector 116 detects the temperature of the transfer line. Thus, the controller 118 employs feedback control to maintain the transfer line at the desired, set temperature, which is usually set by the operator based on their understanding of the solvent, and the temperature at which it condense in the transfer line 19.

Figure 2:
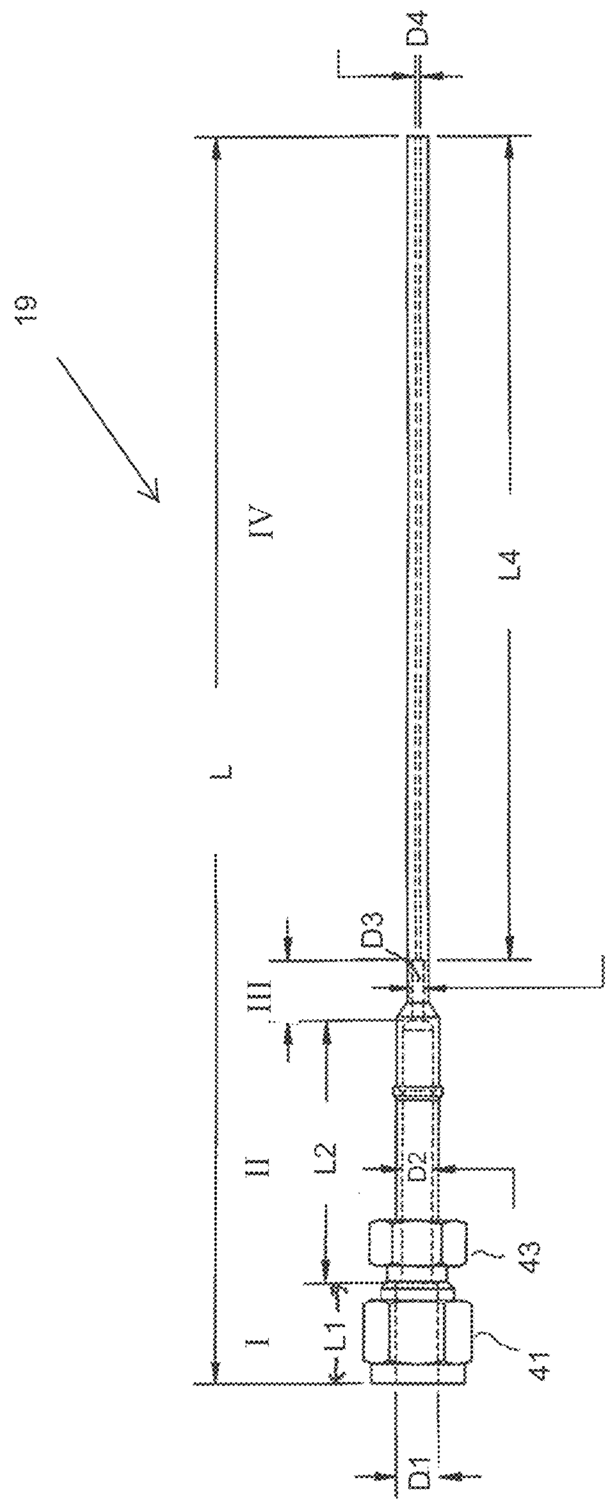
FIG. 2 is a schematic diagram of a transfer line that can be used to practice embodiments of the invention.

An example of a transfer line suitable for practicing embodiments described herein is shown in FIG. 2. Shown in this drawing is transfer line 19, configured to enhance solvent condensation. Transfer line 19 includes means for connecting to the liquid injection port (not shown in FIG. 2), e.g., connectors 41 and 43. Transfer line 19 has a length L, which can be, for example, 1 or more inches long, e.g., 2, 3, 4, 5, 6, 7, 8, 9, 10 inches or longer. In the specific embodiment illustrated in FIG. 2, transfer line 19 includes several segments or zones, specifically zones I, II, III and IV, of various lengths, for example, L1, L2, L3, and L4. In one implementation, L is within a range of from about 7 to about 8 inches; L2 within a range of from about 1 to about 2 inches; L4 within a range of from about 4 to about 5 inches; and L3 is less than about 1 inch, e.g., within a range of from about 0.3 to about 0.5 inches.

The specific implementation of FIG. 2 utilizes several changes in cross section: the inner diameter of transfer line 19 decreases from D1 (at the end proximal to the liquid injection port) to intermediate diameters D2 and D3, the value of D3 being smaller than that of D4, then to a final, still narrower diameter, D4, e.g., at the end proximal to the GC column. The transfer line can be designed to include a larger or smaller number of changes in diameter.

Tapering, sudden decreases in pipe cross section, a continuous reduction in diameter along a portion of the transfer line, or other suitable configurations or combinations thereof can be employed to transition from one cross section to the next.

In one example, transfer line 19 is constructed from stainless steel, has a length of about 7 inches long and an initial inner diameter of ¼ inch (measured at the end proximal to the liquid injection port) which is reduced to a ⅛ or 1/16 inch diameter, at the end proximal to the GC column.

Condensed solvent can be evacuated from the interior of the transfer line using a suitable technique. For example, a “Tee” connector can be installed within or near the transfer line. A valve (manual or automated) can be connected to a vacuum pump and/or, directly or indirectly, to a source of carrier gas for providing a flow that can entrain and remove the excess solvent or purge remaining condensation.

To prepare the equipment for a follow-up analysis, the transfer line can be heated to a temperature selected to vaporize and drive off condensed solvent (e.g., about 100° C. or higher), using, for instance the transfer zone 37 in FIG. 1. Once condensed materials have been evacuated, the transfer line can be cooled to condense the solvent in the follow-up sample. Rapid cooling techniques enhance sample analysis throughput. In an approach that just uses a vacuum, it is possible to perform this step without heating, since the vapor pressure of the material will be significantly lowered, allowing more solvent to re-vaporize.

Figure 3:
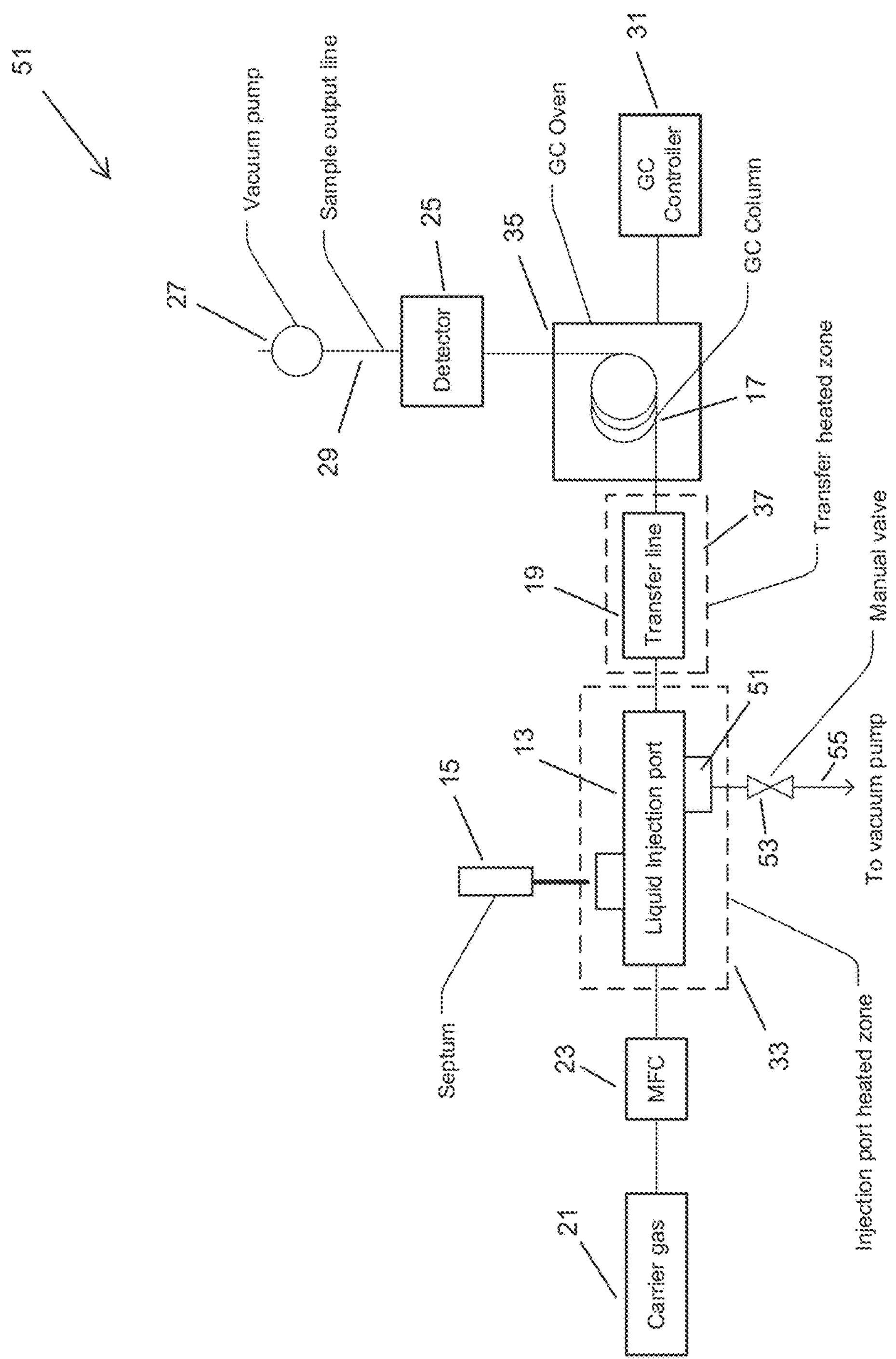
FIG. 3 is a schematic diagram of a system that includes a liquid injection port with manual vacuum backflush.

Shown in FIG. 3 is apparatus or system 51 that utilizes a liquid injection port with manual vacuum backflush arrangement. In this arrangement, connector 51 is provided at or near injection port 13. Manual valve 53 opens and closes access to a vacuum pump via line 55.

Figure 4:
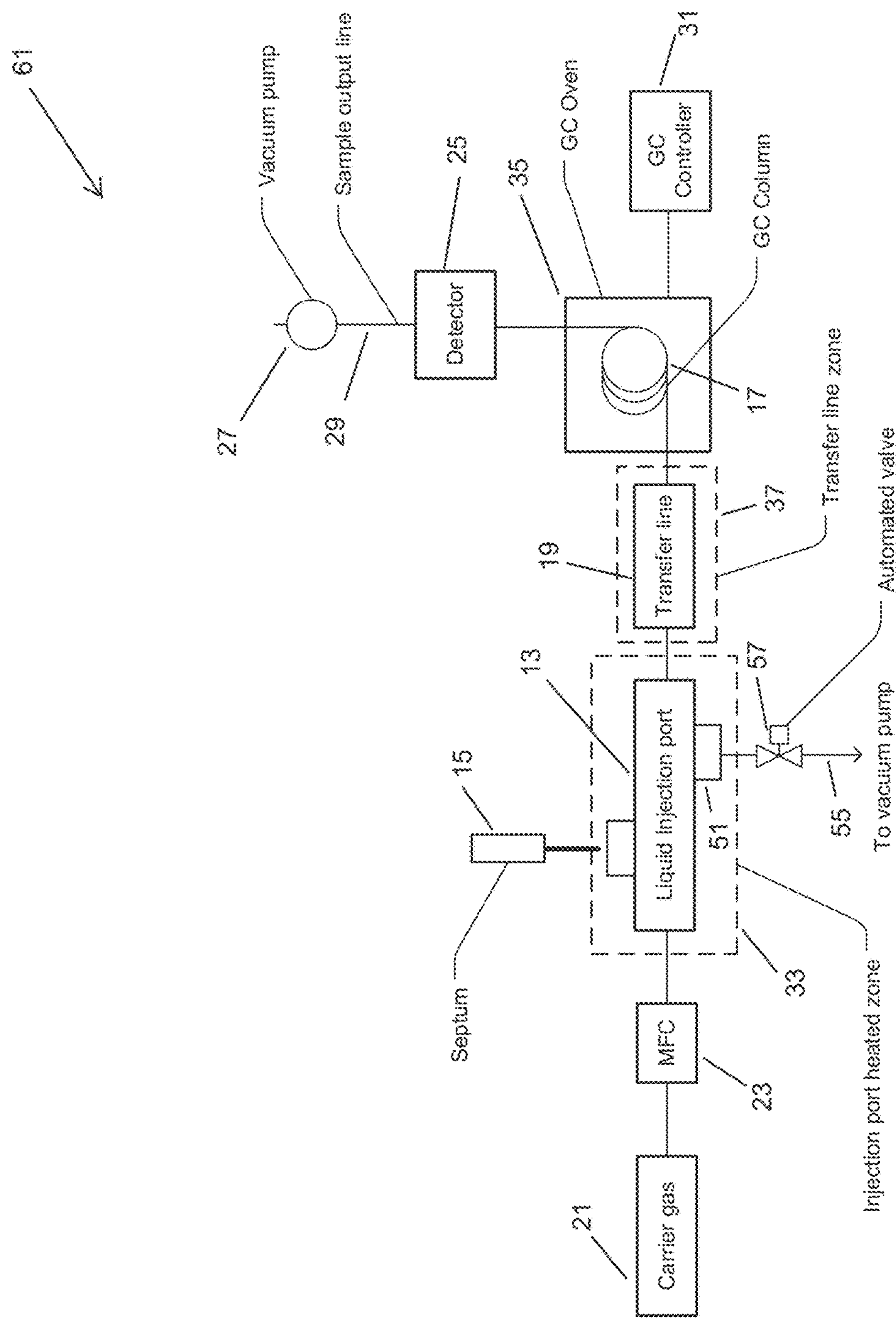
FIG. 4 is a schematic diagram of a system that includes a liquid injection port with automated vacuum backflush.

In FIG. 4, apparatus or system 61 includes a liquid injection port with automated vacuum backflush arrangement and the manual valve 53 in FIG. 3 is replaced by an automated valve 57.

Figure 5:
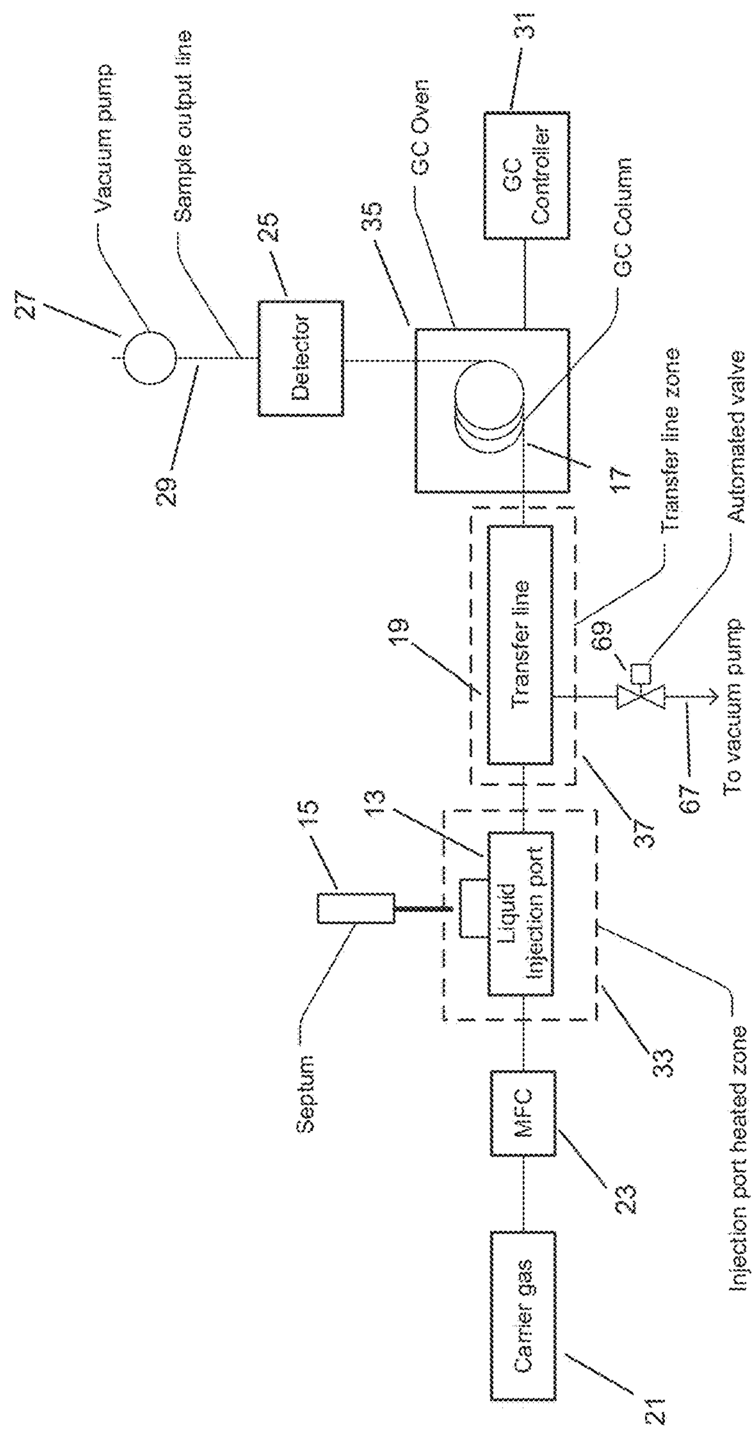
FIG. 5 is a schematic diagram of a system that includes a liquid injection port with an automated vacuum flush on the transfer line.

A liquid injection port with automated vacuum flush on the transfer line is illustrated in FIG. 5, where transfer line 19 is connected via line 67 to a vacuum pump. Flow control is provided by automated valve 69.

In the embodiments of FIGS. 3-5, the injection port heater 110, injection port temperature detector 112, a transfer line heater and/or cooling system 114, and the transfer line temperature detector 116 along with the controller 118, as described in connection with FIG. 1, can also be employed here to provide for stable, specified temperatures to practice the present process.

Figure 6:
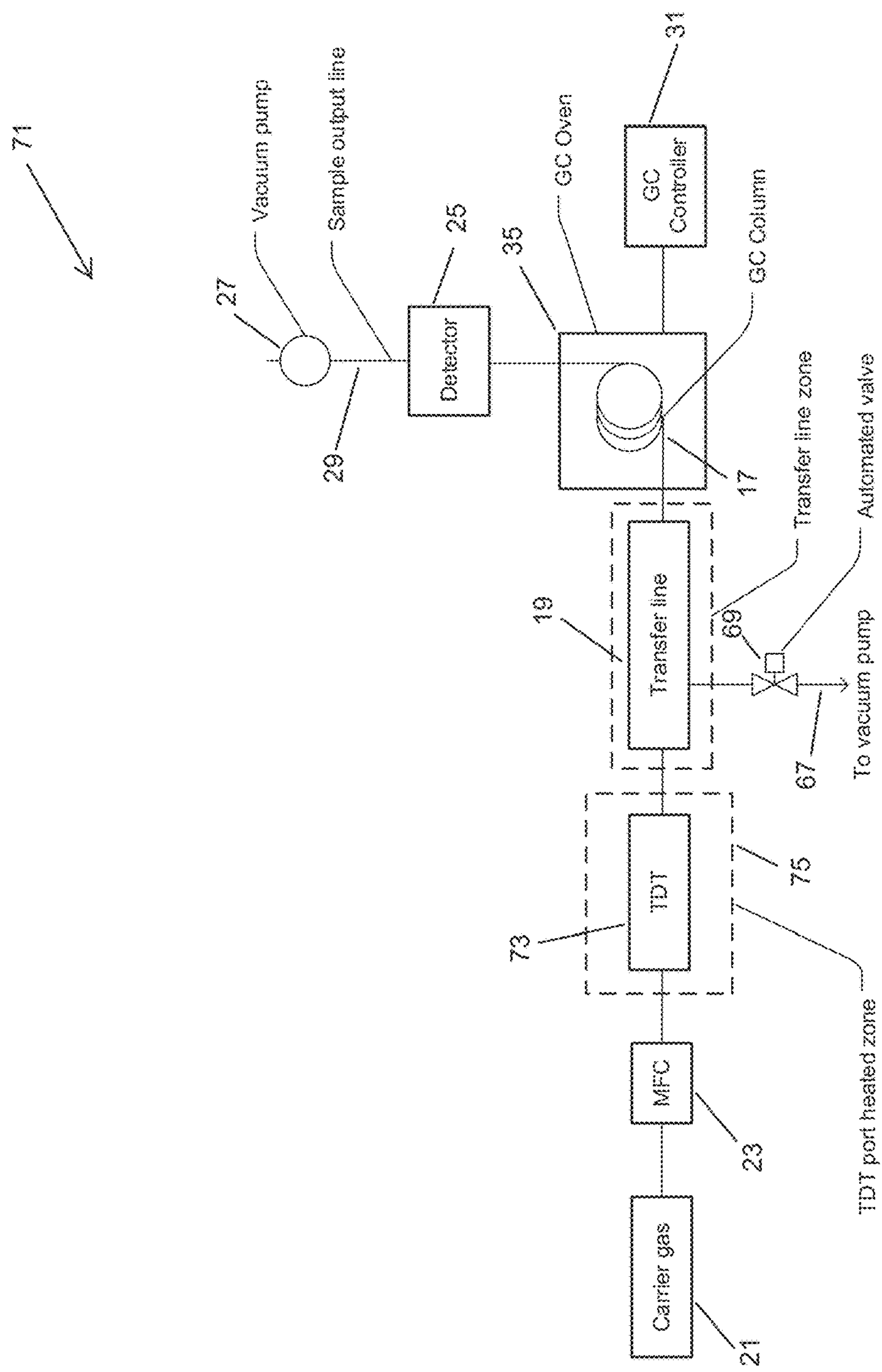
FIG. 6 is a schematic diagram of a system that includes a thermal desorption device port with an automated vacuum flush on the transfer line.

Shown in FIG. 6 is apparatus or system 71 including transfer line 19 provided with an automated vacuum flush on transfer line 19, essentially as described with respect to FIG. 5. Apparatus 71, however, does not employ the liquid injection port 13 shown in FIGS. 1, 3, 4 and 5, but rather a thermal desorption device, specifically TDT 73, disposed in heating zone 75.

In this case, heater and temperature detector for the TDT 73 would be provided instead of the injection port heater 110 and injection port temperature detector 112. However, the transfer line heater and/or cooling system 114, and the transfer line temperature detector 116 along with the controller 118, as described in connection with FIG. 1, would be used.

Figure 7:
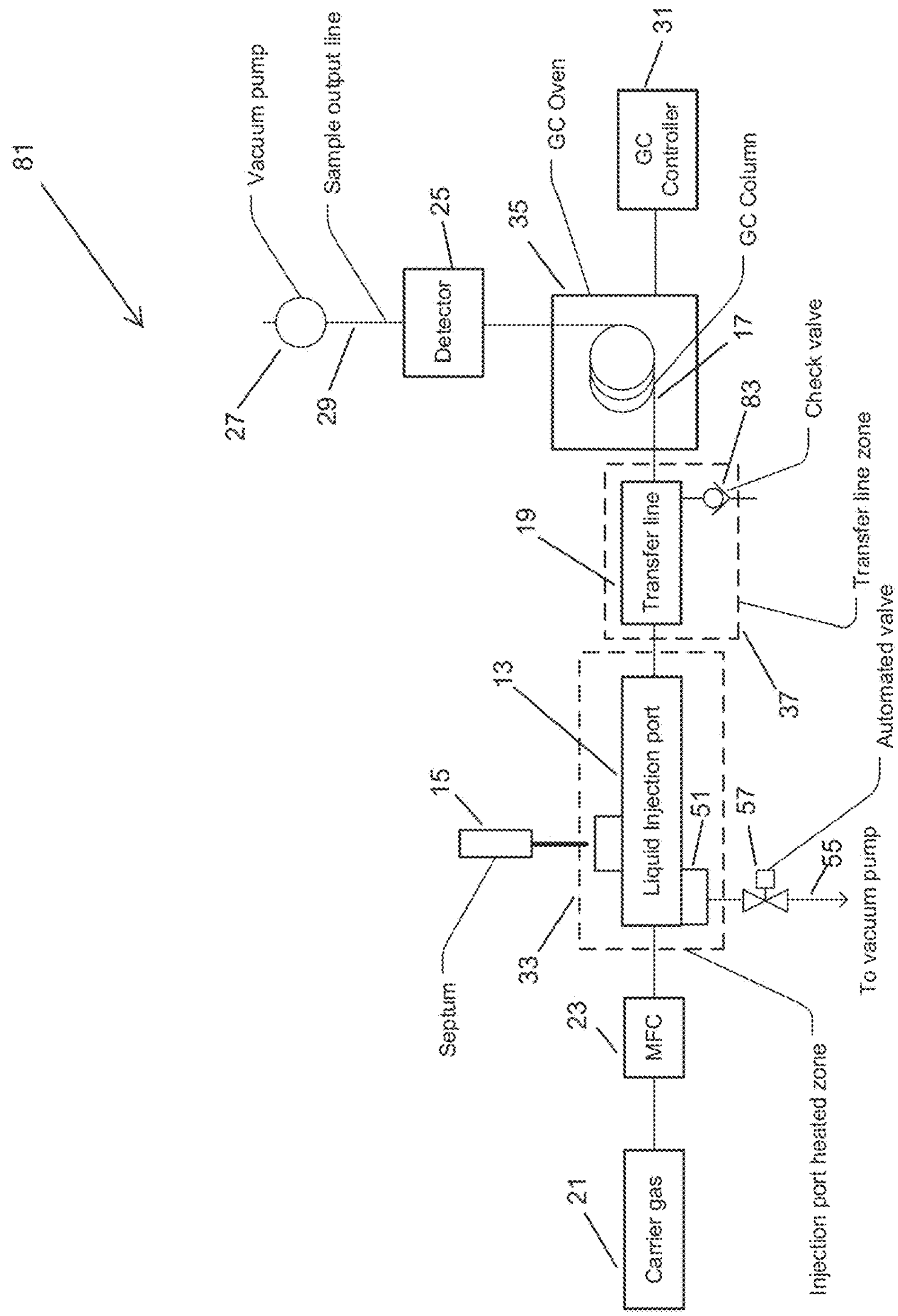
FIG. 7 is a schematic diagram of a system that includes a liquid injection port with an automated vacuum backflush and check valve.

Shown in FIG. 7 is apparatus or system 81 that includes a liquid injection port with automated vacuum backflush and check valve arrangement. Specifically, liquid injection port 13 is provided with connector 51, automated valve 57 disposed on line 55, leading to a vacuum pump, not shown in FIG. 7. Transfer line 19 is provided with check valve 83.

Figure 8:
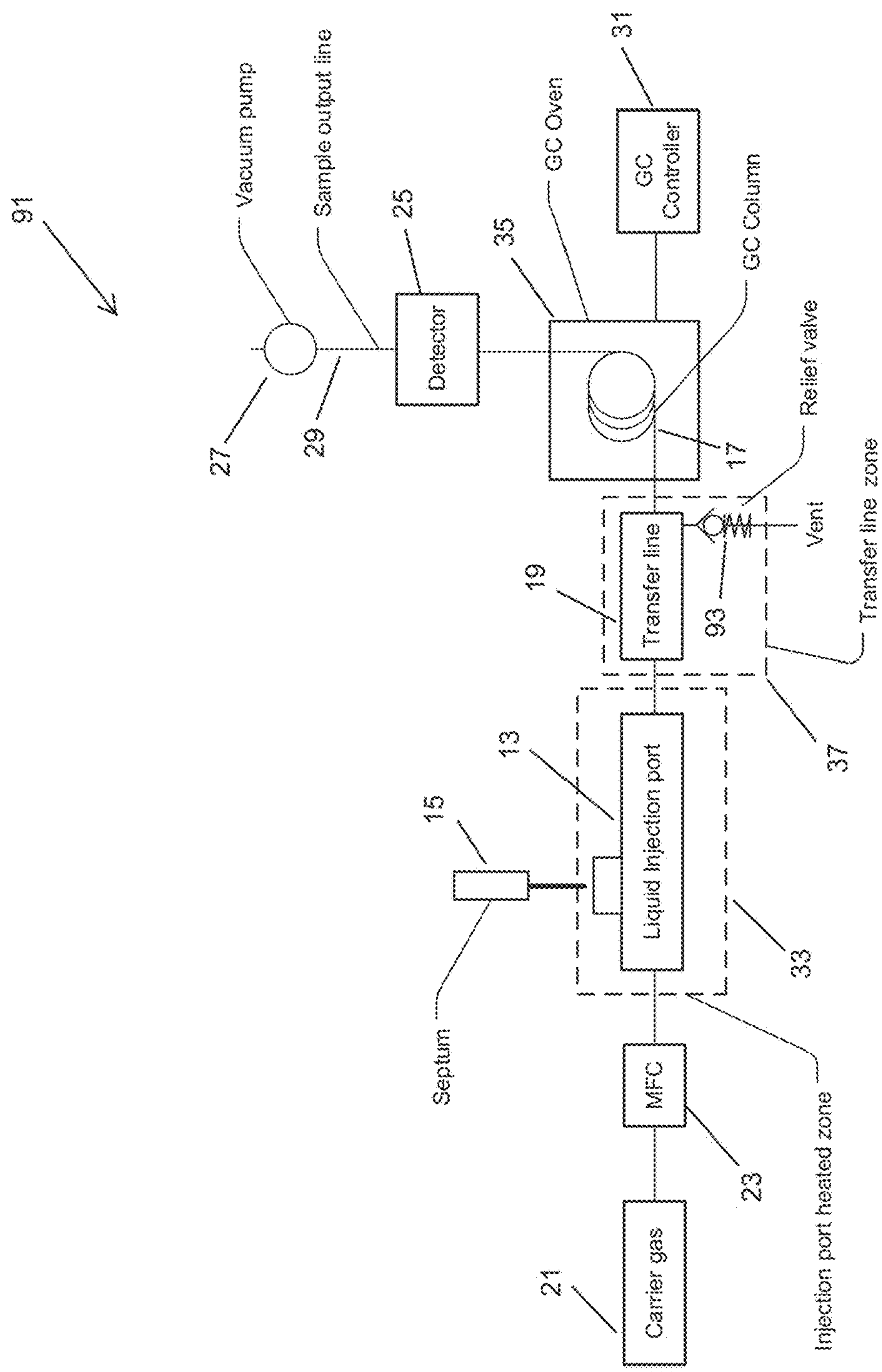
FIG. 8 is a schematic diagram of a system that includes a liquid injection port with high pressure flush.

In FIG. 8, apparatus or system 91 includes a liquid injection port with high pressure flush arrangement. In this embodiment, transfer line 19 is provided with relief valve 93 for venting the system.

During operation, the sample (containing a solvent such as water) is heated to a temperature selected to vaporize the solvent and analytes. This typically occurs at injection port 15, such as by operation of the port heater 110 with feedback control provided by the detector 112. With this port heated at a temperature about the boiling point of the solvent (100° C. for water), all analytes of interest are released. The vapors (of both solvent and analytes) then enter conduit 13 held, at a temperature that is lower, e.g., substantially lower, than the boiling point of the solvent, 50° C., for instance, in the case of a water solvent, by a transfer line heater and/or cooling system 114 and a transfer line temperature detector 116 as previously described. The low temperatures employed, the high concentration of solvent, typically well over 100% for the space volume available in the transfer line, and/or any other factors incorporated in the design of the transfer line, whether alone or in any combination, lead to the condensation of at least a portion of the solvent on the inner surfaces (walls) of the transfer line. In many implementations, all or substantially all the solvent condenses upstream of the GC column. In some cases, 99%, 95%, 90%, 85% by volume condenses within the transfer line 19.

In a typical sample, the analytes are present at very low levels and thus are not close to a condensation vapor pressure, even at the low transfer line temperatures employed to condense the solvent. As a result, analytes proceed through the transfer line, entering the GC column as vapors and without being diluted by the solvent.

Rich in analytes, the solvent-depleted vapors pass through the GC column and are resolved in time into components (also referred to herein as "analyte constituents", or "compounds").

These principles of operation can be further understood by applying Raoult's Law, according to which, the partial vapor pressure of each component of an ideal mixture of liquids is equal to the vapor pressure of the pure component multiplied by its mole fraction in the mixture. For a water-based sample, with analytes at parts per million (ppm) concentrations, the composition of the equilibrium gas phase is essentially water, since the mole fractions of the analytes are so very small. However, with a sample that is initially vaporized at the injection port, solvent as well as the analytes are in a gaseous (vapor) phase, and Raoult's law no longer applies. Instead, what needs to be considered is the vapor pressure of each component. Since typical quantities of vapor are of the order of nanograms (ng) and typical volumes of head space are typically 1 mL or so, most of the analytes remain in the vapor phase, producing good percent recoveries in the GC analysis.

In one illustration, a volume of 100 μL of a water-containing sample is injected into a port held at or near the boiling point of the solvent, at or near 100° C. in this case. It was discovered that excellent GC separations could be obtained with a transfer line several inches long and with a diameter drop from ¼ to ⅛ or 1/16 inch, held at about 50° C.

Relative to a conventional analysis using a 1 μL sample, embodiments described herein are conducted with sample sizes of about 1 mL or more. With solvent condensation and all analytes passing through and eluting from the GC column, the sensitivity of the system can be increased by a factor of 1,000 over the conventional approach. Considering that most GC instruments further split the sample to reduce the size of the injection by a 10 to 100 fold, and that no such splitting is needed to practice aspects of the invention, 10,000 to 100,000 more analytes amounts can now reach the detector.

Embodiments described herein can be practiced with any number of techniques that measure vapors (also referred to herein as gases), and can be applied in the case of direct injection, thermal desorption devices, various GC instruments, including stand-alone GC systems, systems that combine GC and mass spectrometry, systems that combine GC and optical spectroscopy, such as GC-FTIR systems, and so forth.

In one implementation, the techniques described herein are employed in an arrangement and method that couple a time-resolving separator to an analyzer that relies on optical spectroscopic technology, as described in U.S. Pat. Appl. Pub. No. US 2015-0260695 A1, now U.S. Pat. No. 9,606,088, and U.S. Pat. Appl. Pub. No. US 2017-0122920 A1, these patent documents being incorporated herein by this reference in their entirety.

Generally, the system in the U.S. Pat. No. 9,606,088 is configured for analyzing a sample, typically a mixture containing more than one distinct chemical species. Components in the sample can be separated through various suitable techniques. A common temporally-resolving separator is a GC column in which compounds in a mixture become separated based on their flow rates. Typically, lighter gases will elute through a column quicker than heavier ones. In a sample analysis system such as, for example, that described in U.S. Pat. No. 9,606,088, the GC column allows the FTIR system to differentiate substances with similar looking spectra using time. The electromagnetic-based radiation spectroscopic device (an FTIR system, for example) can be used to identify and, in many cases, quantify the species present, resolved temporally by the separator. The coupling between separator and optical spectroscopic analyzer can be based on a sample cell having particular features. Controls, automation instrumentation, computer interfaces, algorithms and/or software-related features also can be provided.

Figure 9:
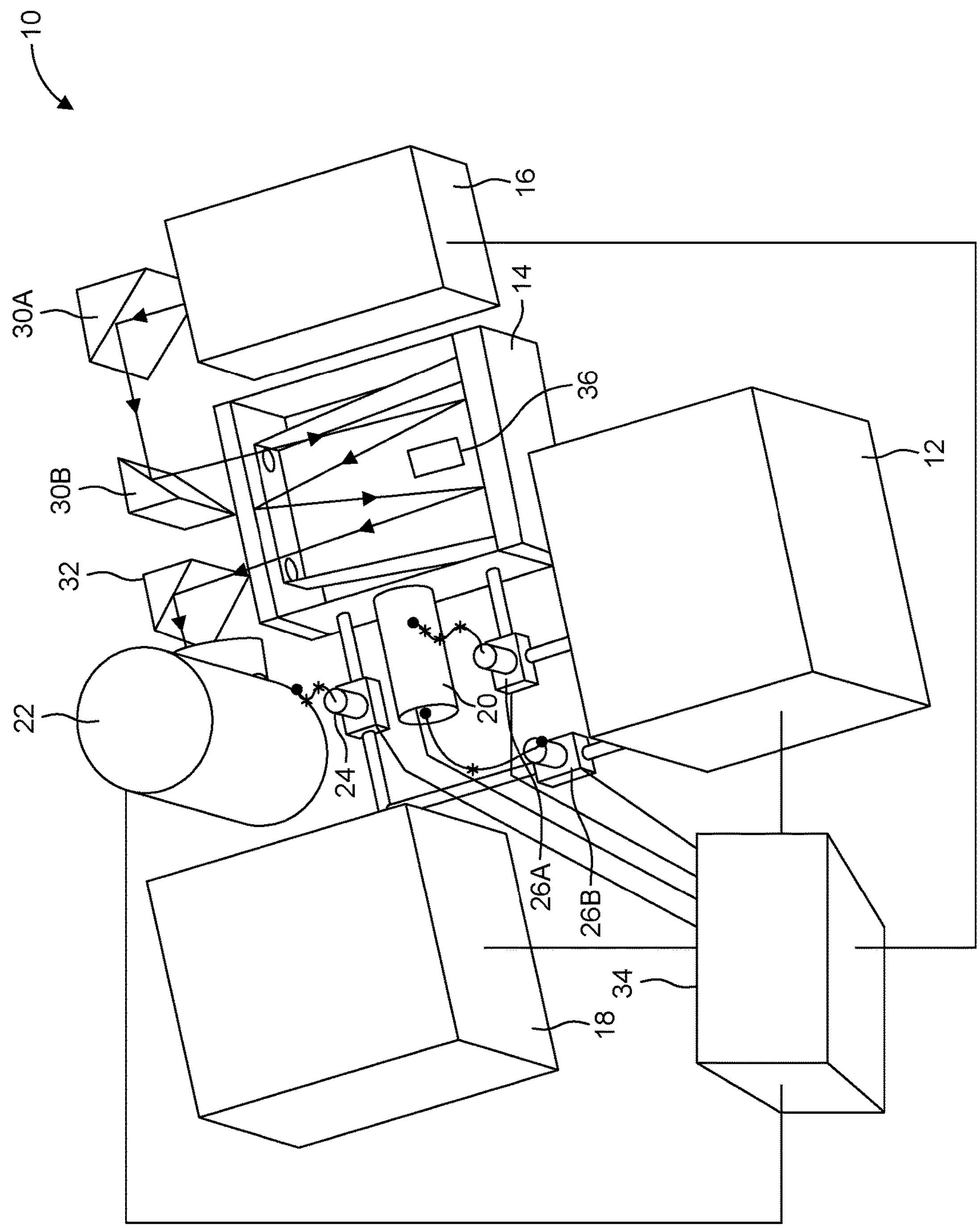
FIG. 9 is a schematic diagram of a GC-FTIR sample analysis system that can be used to detect and measuring contaminants in a solvent-rich sample such as, for example, a water sample.

Shown in FIG. 9, for example, is a system 10, including a separator such as gas chromatograph (GC) 12, sample cell 14, and a spectrometer, e.g., FTIR spectrometer 16, which includes a light, and more generally, an electromagnetic (EM) radiation source. GC 12 and/or FTIR spectrometer 16 can be commercially available instruments, with exhaust from the GC being often directly coupled to the FTIR sample cell.

GC 12 is provided with an injection port, a GC column and a conduit or transfer line such as described above. These elements are not explicitly shown in FIG. 9; rather, reference is being made to FIG. 9, for example.

Some embodiments described herein can be practiced or adapted to other separator systems and other spectrometry beyond GC-FTIR. For example, the spectrometry system determines the spectral response of the components in the sample cell in one or more of the following spectral regions millimeter, microwave, terahertz, infrared (including near-, mid- and/or far-infrared), visible, ultraviolet (UV) (including vacuum ultraviolet (VUV)), x-rays and/or gamma. Further, the detection employed can measure different characteristics, such as absorption spectra, emission (including blackbody or fluorescence) spectra, elastic scattering and reflection spectra, impedance (e.g., index of refraction) spectra, and/or inelastic scattering (e.g., Raman and Compton scattering) spectra of the components in the sample cell 14.

Typically, output from the separator, e.g., GC 12, is in a gaseous state, containing one or more gases and/or vapors. This output is directed to sample (also referred to as gas) cell 14.

In some examples, the cell 14 is a vessel that can be evacuated and configured to maintain a gas pressure lower than the surrounding (atmospheric or ambient) pressure to integrate the sample over time. In specific implementations, the pressure in the sample cell is within the range of about 0.001 to about 1.0 atm. For instance, a flow rate of 1 mL/minute, a sample cell volume of 200 mL and a starting gas cell pressure of ½ atmosphere can provide a 100-minute time period for data acquisition. This is considered a sufficient time window for most GC sample analyses. The pressure in the sample cell is reduced with a vacuum pump 18, or alternative apparatus capable of drawing a vacuum.

The pressure in the sample cell can be monitored with a sensor, such as an absolute pressure sensor 20.

In other examples, the gas cell 14 is a partially integrating cell or a flow cell, such as a lightpipe, through which the output from the separator flows.

In some cases, no vacuum is required and the system can be operated at a suitable pressure. For instance, a compressor or column head pressure could be used to compress or flow the output from the GC into and possibly through the sample cell 14. Preferably, over pressurizing is avoided.

Sample cell 14 also receives electromagnetic radiation, for instance from light generated in FTIR arrangement 16 and can be designed to fit in the sample compartment of a commercial FTIR or other type of spectrometer. The cell is provided with optical components, such as windows that allow transmission of an electromagnetic radiation beam within a desired wavelength (or frequency) range into and out of the cell 14.

In the specific illustrated example, output radiation exits sample cell 14 and is directed by reflector 32 to detector 22, for instance a MCT (mercury cadmium telluride) device suitable for measuring the light in an FTIR. Specific examples employ liquid nitrogen cooled MCTs. One example of a suitable detector for a broad spectral analysis capability can be a 1 mm mid-band MCT with a cutoff of 16 μm.

System 10 includes electronics and computer systems. It can further include computer systems, video displays, devices, units, interfaces, data co-processors, and/or other components for data processing, analysis (including multivariate qualitative and quantitative), recording, reporting, equipment controls, automation, flow control and controllers, pressure sensors and controllers, heaters and temperature controllers, valves and vacuum generation technology, spectral libraries, and so forth. These components are generally indicated by reference numeral 34. One or more processors, memory devices, and so on, are provided in the computer systems for executing processes of the present invention.

Computer 34 in FIG. 9, and/or any associated components are configured for executing software for implementing embodiments of the present invention, allowing automated data handling and analysis based on processes described below.

During operation, gas is captured in sample cell 14 for a specific time, based on the gas turnover rate in the sample cell. Various flow conditions can be employed. In a transient mode, for instance, the entire experiment (run) is conducted under a set, i.e., unchanging pressure, e.g., under a set vacuum pressure. In a full integration mode, sample cell 14 is evacuated and the sample is allowed to accumulate in the sample cell, with the pressure changing throughout the analysis. Also possible is a partial integration mode, where the sample cell is evacuated to a set pressure and a dilution gas is added and maintained in the cell for a period of time, e.g., 1 minute. Other operating modes can be employed, such as, for example, a mode that reduces the size of the data set. In other cases, a flow cell, such as a light pipe, is employed. In the light pipe or similar flow cell, the gas continuously flows through the cell with a characteristic residence time in the cell.

In some arrangements, a continuous carrier gas flow (e.g., $N_2$ or other suitable carrier gas) is directed from GC 12, into the sample cell. If desired, sample cell 14 can be closed to the $N_2$ flow from GC 12, for a given time interval. In yet other arrangements, the carrier gas, or the sample from the GC can be diverted to a secondary pumping service (not shown in FIG. 9) to prevent spectral interference from large concentration compounds such as solvent species. The flow can then be switched for sample collection. If pumping continues, the compounds that come off during this time will be standard chromatographic components (peaks) and their concentrations can be calculated as such. The peak will go up and go down as it enters and exits the sample cell so no further averaging will be done.

If sample cell 14 is initially evacuated, then sealed from pump 18, the carrier gas and sample components from the GC can accumulate in or flow through the sample cell and spectra can be obtained during the entire data collection. Since the chemicals are captured in the sample cell, the entire amount of each gas (compound) can be measured once it has completely eluted from the separation device (GC). Since the gas cell is a multiple pass gas cell in a preferred embodiment, there can be an increased absorption for each gas when compared to "light pipe" system in an optimized design. By letting all the gas remain in the gas cell, this in effect integrates the sample peak from a traditional analyzer where the sample moves past or through the detection system. This integration provides a further enhancement in SNR, which can be a factor of 2 to 5 times since the entire amount of sample is measured once it has completely eluted. Typically, this improvement is dependent on the width of the eluted peak.

In specific implementations, a control circuit managed by the computer system 34 dynamically controls the sample cell pressure. For instance, automated valves can be set to pull a vacuum on sample cell 14 before starting a run or drawing the components through a flow cell. Pressure levels in the cell can also be controlled automatically. In many cases, isolating sample cell 14 from pump 18, thus allowing gas to accumulate in the sample cell, is also performed automatically. Automation can be used to set a desired carrier gas flow from the separator, e.g., GC 12, into the sample cell, to isolate the cell from the carrier gas, to divert the carrier gas to any secondary pumping station, to switch the flow to the FTIR gas cell for sample collection, and so forth.

With respect to data handling such as data collection and analysis, a process carried out in a system such as system 10 of FIG. 9 can involve data collection; data integral, differentiation or signal averaging; data spectral deconvolution/quantification; data reporting; among others. Computed data, plots generated by computer system 34, for instance, can be displayed in a graphical user interface of a display device of the computer system 34.

During operation, a sample is directed from the temporally-resolving separator to the sample cell, e.g., a gas cell that fully or partially integrates the components provided by the separator. The sample cell can be partially or fully evacuated and fluids such as gases and/or vapors are allowed to accumulate in the sample cell, effectively integrating their spectral signatures. Multiple spectra obtained over a time interval could then be averaged to best measure the integrated concentration in the sample cell. Obtaining a moving background that includes spectra from a previously eluted sample component, e.g., previously eluted chemical species, allows for the analysis of the current eluting components without interference from previously eluted components. The integrated and averaged multiple spectra can be corrected by using a similarly collected moving background, and the corrected data are compared to known spectra to identify one or more components, e.g., chemical species such as atoms, molecules, molecular fragments, ions, present in the sample component.

Data integral/differentiation/signal averaging functions can utilize, for instance, a 1 minute moving spectral average. Time spacing between background and sample spectrum can be varied. Data spectral deconvolution/quantification can be provided by a moving multiple linear regression based on compound retention index. A new regression matrix can be built for each spectrum analyzed in real time. Compounds selected for each regression are present for a relative distance +/− of its own retention index. Very high concentration components, internal standards or solvents can be present in a select set or in all regressions.

Typically, calibration data can be provided for each compound, and, in specific implementations at multiple concentrations. Retention index per compound can be determined using hydrocarbon reference standards or obtained from current mass spectral library data. For instance, retention index data are available from many sources, as known in the art, and are typically provided based on the type of column being utilized. Calibration data can be called when a certain index is reached, e.g., for the deconvolution operation. An initial prediction could be performed to determine which compounds within a retention index window might actually be present. This initial screening will limit the number of compounds then utilized in the multivariate analysis.

Another implementation of the invention relates to sample analyses that employ a "purge and trap" approach. Traditional purge and trap techniques aim at increasing the amount of water being analyzed. In a typical arrangement, the sample is a liquid (containing normally water) and it is purged with $N_2$ to cause the chemicals to partition into the gas phase and be collected on a sorbent trap. This trap is considered a "first" or "primary" trap in those arrangements in which there is a secondary, focusing trap. In the modified purge and trap technique described herein, the entire sample can be vaporized, thereby reducing trapping requirements, eliminating, for example, the need for the secondary trap (e.g., a TDT).

A further implementation utilizes a cryo trapping approach. In this approach, the trap is cooled to a temperature at which water and other chemicals are collected, while letting $N_2$ and $O_2$ pass through, thus concentrating the air.

In general, by using techniques described herein, at least 1 mL of sample could potentially be injected, a volume far exceeding the volume handled by today's chromatography.

For example, if a system such as that illustrated in FIG. 9 is operated in the absence of the water condensation, a water sample with a volume of 100 μL generates 211 mL of water vapor at temperatures near 191° C. Initially, this was thought to represent the upper limit of the injection volume for a gas cell 14 having a volume of 211 mL. It was discovered, however, that, by condensing the water solvent upstream of the GC column, larger volumes are not only possible but may be easily accomplished.

This is also the case for TDT collection. While the initial upper limit for water volumes trapped on the TDT was thought to be of the order of 100 μL, embodiments described herein make possible the collection of significantly higher volumes.

Using a cryotrap and an air sample containing 2% water can concentrate the air ~50 fold, if the water is directly injected into the GC. Employing a sample analysis approach based on the teachings of U.S. Pat. No. 9,606,088, a 100 μL injection would generate 211 mL of water vapor at 191° C. which is, in many cases, the temperature and the volume of gas cell 14. If the analyzer detector has a fundamental detection limit of 50 ppbv, with no sample concentration, a 1 mL injection condensed from an air sample at 2% water would provide a sample detection limit 500 times lower, or 100 parts per trillion (ppt).

In one implementation, the GC instrumentation configured to allow large sample injection volumes, without sample splitting, and without affecting the chromatography, can be applied to improve existing sampling procedures or standard protocols such as, for instance, US EPA Method 18, MEASUREMENT OF GASEOUS ORGANIC COMPOUND EMISSIONS BY GAS CHROMATOGRAPHY. This is illustrated in the non-limiting example described below.

EXAMPLE

Techniques involving cryo-trapping are particularly attractive in situations in which environmental sources contain very high levels of water, like a Regenerative Thermal Oxidizer (RTO) on an ethanol plant. In such cases, water levels can easily exceed 40% by volume. This high level of water makes it difficult to collect useful samples for future analysis by GC or other wet methods. It also presents problems when attempting to analyze the raw stream by FTIR, since the water obscures many of the regions where the analytes absorb. FTIR detection limits tend to be in the 5 to 10 ppmv range due to the water absorption. Since many of the compounds are hazardous air pollutants or HAPs, lower MDLs are really required, rendering traditional FTIR analyses useless.

A sampling system in which a liquid nitrogen ($LN_2$) cryo sampler passes the emission sample through a cryo cooled U-tube can traps all the moisture and water soluble or partially soluble analytes of interest in the U-tube. Once the sample is collected, the U-tube can be sealed and allowed to thaw, so that an aqueous solution forms at the bottom of the U-tube. The mixture can then be poured into a small septum capped vial. An aliquot of this sample can then be run multiple times to demonstrate recovery and data precision.

A suitable sampling procedure involves 12 sampling U-tubes prepared using thin walled ½ inch stainless steel tubing, so that multiple paired samples can be collected during a simulated compliance test at an ethanol RTO. At either end of the U-tube Swagelok® fittings were utilized to seal the tube after sample collection.

A heated manifold set to 191° C. was placed at the exhaust of a MKS MultiGas™ 2030 FTIR gas analyzer also set at 191° C. Two U-tubes were connected to this heated manifold through Swagelok valves. The exhaust of the U-Tube was connected to a sampler that pulled 0.5 L/min of sample through both tubes simultaneously.

A heated injection port was placed on the manifold just in front of both U-tubes to inject a spiked amount of target analytes (in one U-tube) and a tracer of tetrahydrofuran (THF), in both U-tubes, to determine the dilution of the spiked analytes. The injections occurred after the U-tubes were submerged in $LN_2$ and the sampling had commenced. Sampling lasted for approximately 5 minutes at 0.5 L/min. 6 sets of samples were collected using this procedure.

Once thawed, each collected mixture was then thoroughly mixed to assure complete mixing and the solution was poured into a small 2 mL vial capped with a septum.

Other pertinent sampling parameters are presented in the chart below. Since the injected samples are just from the condensed moisture, the % moisture in the original stream measured by the FTIR gas analyzer portion is critical. If the moisture is 50%, the sample is two-fold concentrated in the liquid form. The total sample volume may be important for the purpose of spike recovery, but the dilution of the tracer THF is a more accurate measure of the total sample and dilution.

| Sample Information | |
|---|---|
| Percent Moisture in Sample Stream | 43.60% |
| MAX Sampler Flow Rate (mL/min) | 500 |
| Sample Time (mm:ss) | 05:00 |
| Vol 5000 ng/uL THF solution spiked into sampling train (uL) | 10.0 |
| Total THF Spiked per Train (ng) | 53203 |
| Calculated Sample Vol of Spiked Train (uL) | 2470 |
| Calculated Sample Vol Unspiked Train (uL) | 2542 |
| Vol 1000 ng/uL calibration solution spiked into sampling train (uL) | 10.0 |
| Vol liquid sample injected into MAX (uL) | 100. |

Once the 2+ mL samples were collected, a 100.0 μL aliquot of this solution was then injected into a MAX™ GC-FTIR for analysis by USEPA Method 18. The MAX analyzer was specially configured to allow for large sample injection volumes without sample splitting and without affecting the chromatography.

Parameters for the GC program and MAX instrument method are found in the table below.

| Instrument Profile | |
|---|---|
| Liquid Injection Port | 100° C. |
| GC | 50° C., 300 sec |
| | 50° C. to 125° C. at 5° C./min |
| | 125° C. to 230° C. at 20° C./min |
| | 230° C., 150 sec |
| MFC | 5 mL/min |
| Solvent Purge Delay | 60 sec |

The MAX GC-FTIR has a resident calibration for each compound. To remain near compliant to the current method, liquid standards were prepared for spiking and for direct analysis on the MAX GC-FTIR.

Below is a standard mixture prepared for seven compounds found in $CO_2$ scrubbers and RTO emissions at ethanol plants. The expected concentrations as determined were within 10% of the resident calibration for all but methanol and acrolein. The high methanol was most likely due to syringe contamination and the low acrolein was most likely due to its reactivity. MAX calibration curves are by definition constant and since this was not a true compliance test the reported levels were utilized rather than adjusting the calibration curve. As can be observed, the RSDs (relative standard deviations) were quite good across the board with all of them less than 5%. Formaldehyde, formic acid and acetic acid also emanate from these plants but are not conducive to chromatography and can be measured directly by FTIR gas analysis.

Ethanol Plant Calibration Standard

| | Results | | | | | |
|---|---|---|---|---|---|---|
| | Run 1 | Run 2 | Run 3 | Average | % Expected | % RSD |
| Methanol | 1135 | 1172 | 1156 | 1154 | 122.14% | 1.61% |
| Acrolein | 779 | 796 | 760 | 778 | 77.74% | 2.31% |
| Acetaldehyde | 958 | 901 | 907 | 922 | 92.72% | 3.40% |
| 2-Furaldehyde | 912 | 935 | 965 | 937 | 101.62% | 2.84% |
| Ethanol | 988 | 1026 | 975 | 996 | 105.78% | 2.66% |
| Ethyl acetate | 991 | 1002 | 968 | 987 | 91.70% | 1.76% |
| 3-Methyl-1-butanol | 859 | 912 | 897 | 889 | 92.01% | 3.07% |

A 10 μL aliquot of the above mixture was added to the spiked U-tube samples, to demonstrate spiked recoveries. To determine the dilution of these spiked materials, a THF mixture was also prepared and analyzed. THF is water soluble, a strong IR absorber, and not expected in this stream so it made for an excellent tracer material. This solution was utilized to know the exact dilution of the spiked samples and to gauge the total liquid sample volume collected. Once again, the RSDs are excellent and the expected concentrations are within 10% of the stored calibration on the instrument. A 10 μL aliquot of this mixture was also added to both of the U-tubes for dilution calculation purposes.

THF Internal Standard

| | Results | | | | | |
|---|---|---|---|---|---|---|
| | Run 1 | Run 2 | Run 3 | Average | % Expected | % RSD |
| Tetrahydrofuran | 5406 | 5212 | 5343 | 5320 | 107.44% | 1.86% |

Figure 10:
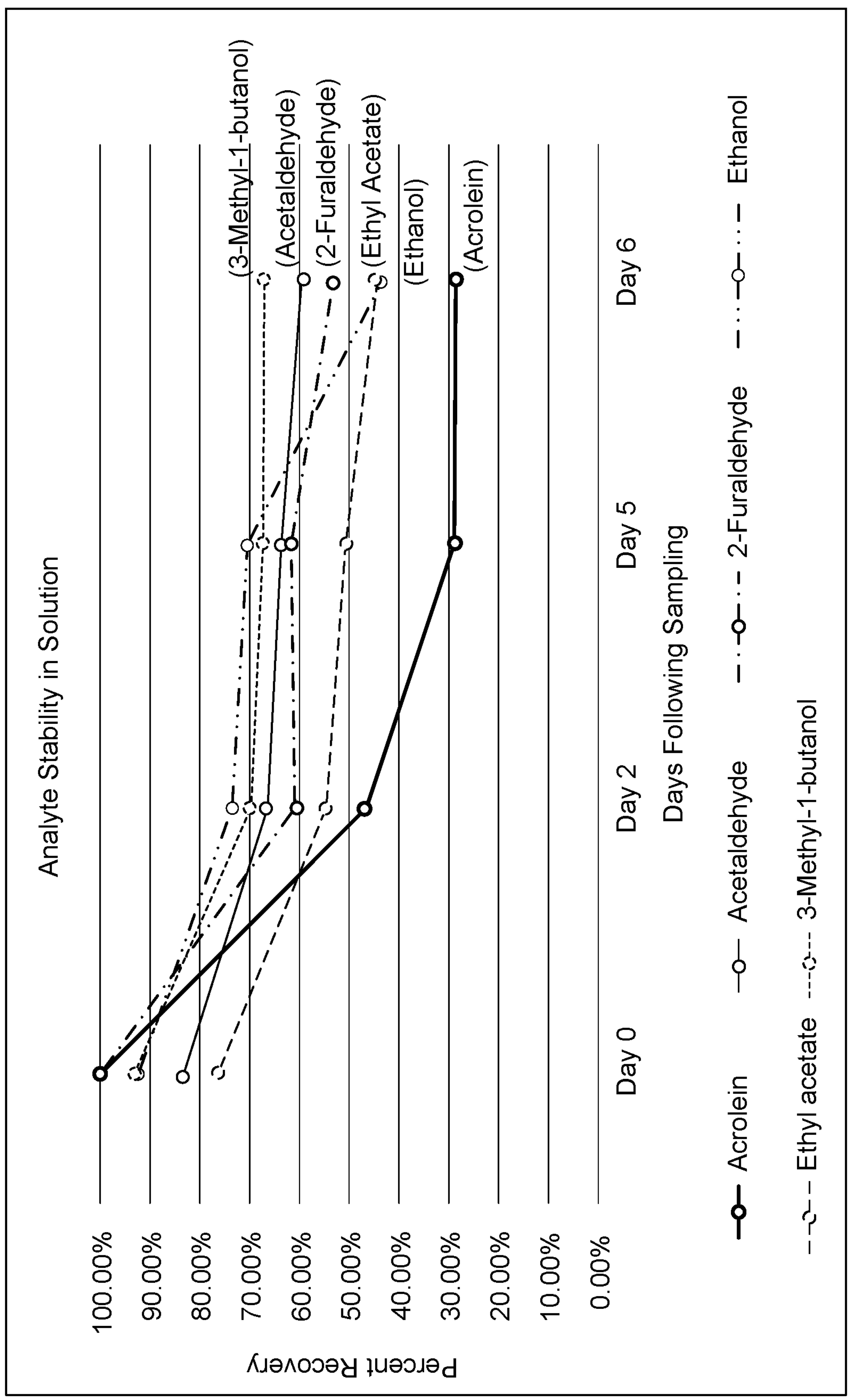
FIG. 10 is a series of plots of analyte recovery as a function of time.

One of the spiked samples that was collected during the simulated compliance test was analyzed immediately and the % recoveries were calculated. All recoveries were well within the requirements of Method 18. This sample was then shipped, from the on-site sampling point to the analysis lab. The sample was then analyzed on a different MAX™ analyzer over the next few days to show how the recoveries changed with sample aging. This also demonstrates how certain calibration materials can change in solution over time as well. Below is a table with the calculated recoveries for the critical analytes. Plots of the recoveries versus time are shown in FIG. 10.

It was observed that when samples are collected in water and transported to the lab, the recoveries changed significantly over the first 48 hours and then stabilized for everything but acrolein, which continued to deteriorate through Day 5.

Sample 4 Results—Percent Recoveries vs Days Following Sampling

| | Days Following Sampling | | | |
|---|---|---|---|---|
| | Day 0 | Day 2 | Day 5 | Day 6 |
| Acrolein | 100.85% | 46.57% | 28.81% | 28.56% |
| Acetaldehyde | 83.18% | 66.24% | 63.63% | 59.72% |
| 2-Furaldehyde | 99.76% | 60.88% | 61.74% | 53.19% |
| Ethanol | 91.85% | 73.56% | 70.54% | 43.61% |
| Ethyl acetate | 76.28% | 54.68% | 50.92% | 44.43% |
| 3-Methyl-1-butanol | 92.99% | 69.80% | 67.32% | 66.87% |

Below are the raw data from one condensed sample and its duplicate spiked sample, each were run multiple times after the samples were returned to the analysis lab. The spiked train containing all the suspected compounds was run 4 times, the duplicate sample solution was only run 3 times since all the compounds were less than detection both in the field and in the lab.

Runs 1 and 2, were performed on Day 2 and averaged to generate the Day 2 point above. Run 3 was on Day 5 and Run 4 was on Day 6. The average % recoveries over these three days were not good for acrolein or 3-methyl-1-butanol, but passed the 70-130% requirement for all the other materials. The high % RSD as would be expected for acrolein as the compound was being lost during storage. This further demonstrates the need to run these samples as they are collected on-site, when reactive species like acrolein are present in the sample.

All sample runs (unspiked) were performed on Day 5. These samples were run later since no concentrations above detection were observed in the field sample analysis and it was more important to understand the changes in concentrations in the spiked samples over time. The detection limits were listed in both ng and in ppb for the unspiked sample. All detection limits were below 200 ppbv with many below 100 ppbv.

The calibration data are further discussed below. A solution of the six main compounds of interest that can be found in the exhaust of an Ethanol RTO plus methanol was prepared on in water to use as a calibration check on two MAX GC-FTIR instruments. A second solution of THF in water was also prepared to assist in measuring the dilution of the spike constituents in the spiked sample.

The lab instrument data were collected immediately after the preparation of each of the standards. Methanol contamination may have occurred since it is used to clean the syringe and a small amount on the tip or in the barrel could have generated the high result.

When the multiple component standard was sent to the field and utilized, there was a sizeable reduction in the acrolein observed, as would now be expected since it appears that acrolein degrades in solution quickly over time. The methanol level was lower as was the 2-furaldehyde both of which could have been due to syringe contamination in the lab.

| | Spiked Train | | | | | | | | |
|---|---|---|---|---|---|---|---|---|---|
| Compound | Run 1 Mass (ng) | Run 2 Mass (ng) | Run 3 Mass (ng) | Run 4 Mass (ng) | Average Mass (ng) | % RSD | Spike - Sample | Expected Mass(ng) | Average % Recovery |
| Acrolein | 214 | 148 | 112 | 111 | 158 | 32.74% | 158.00 | 315.07 | 50.15% |
| Acetaldehyde | 312 | 298 | 293 | 275 | 301 | 3.27% | 301.00 | 373.22 | 80.65% |
| 2-Furaldehyde | 286 | 284 | 289 | 249 | 286 | 0.88% | 286.33 | 379.43 | 75.46% |
| Ethanol | 354 | 378 | 351 | 217 | 361 | 4.10% | 361.00 | 403.31 | 89.51% |
| Ethyl acetate | 264 | 275 | 251 | 219 | 263 | 4.56% | 263.33 | 399.54 | 65.91% |
| 3-Methyl-1-butanol | 316 | 304 | 299 | 297 | 306 | 2.85% | 306.33 | 360.00 | 85.09% |
| THF | 2079 | 2230 | 2152 | 1974 | 2154 | 3.51% | | | |

| | Unspiked Train | | | | |
|---|---|---|---|---|---|
| Compound | Run 1 Mass (ng) | Run 2 Mass (ng) | Run 3 Mass (ng) | Average Mass (ng) | % RSD |
| Acrolein | <100 | <100 | <100 | <100 | N/A |
| Acetaldehyde | <150 | <150 | <150 | <150 | N/A |
| 2-Furaldehyde | <50 | <50 | <50 | <50 | N/A |
| Ethanol | <150 | <150 | <150 | <150 | N/A |
| Ethyl acetate | <70 | <70 | <70 | <70 | N/A |
| 3-Methyl-1-butanol | <50 | <50 | <50 | <50 | N/A |
| THF | 2057 | 2161 | 2061 | 2093 | 2.82% |

| | Spiked Train | | | | | | | | |
|---|---|---|---|---|---|---|---|---|---|
| Compound | Run 1 Conc (ppb) | Run 2 Conc (ppb) | Run 3 Conc (ppb) | Run 4 Conc (ppb) | Average Conc (ppb) | % RSD | Spike-Sample | Expected Conc (ppb) | Average % Recovery |
| Acrolein | 190 | 131 | 99 | 98 | 140 | 32.74% | 140 | 279 | 50.15% |
| Acetaldehyde | 352 | 336 | 330 | 310 | 339 | 3.27% | 339 | 421 | 80.65% |
| 2-Furaldehyde | 148 | 147 | 149 | 129 | 148 | 0.88% | 148 | 196 | 75.46% |
| Ethanol | 382 | 408 | 378 | 234 | 389 | 4.10% | 389 | 435 | 89.51% |
| Ethyl acetate | 149 | 155 | 142 | 123 | 148 | 4.56% | 148 | 225 | 65.91% |
| 3-Methyl-1-butanol | 178 | 171 | 168 | 167 | 173 | 2.85% | 173 | 203 | 85.09% |
| THF | 1432 | 1536 | 1482 | 1360 | 1484 | 3.51% | | | |

Concentration in ppb is concentration in source stream (43.6% moisture)

| | Unspiked Train | | | | |
|---|---|---|---|---|---|
| Compound | Run 1 Conc (ppb) | Run 2 Conc (ppb) | Run 3 Conc (ppb) | Average Conc (ppb) | % RSD |
| Acrolein | <89 | <89 | <89 | <89 | N/A |
| Acetaldehyde | <169 | <169 | <169 | <169 | N/A |
| 2-Furaldehyde | <26 | <26 | <26 | <26 | N/A |
| Ethanol | <162 | <162 | <162 | <162 | N/A |
| Ethyl acetate | <39 | <39 | <39 | <39 | N/A |
| 3-Methyl-1-butanol | <28 | <28 | <28 | <28 | N/A |
| THF | 1417 | 1489 | 1420 | 1442 | 2.82% |

| | Results | | | | | |
|---|---|---|---|---|---|---|
| | Run 1 | Run 2 | Run 3 | Average | % RSD | % Expected |
| Ethanol Plant Calibration Standard - Lab Instrument | | | | | | |
| Methanol | 1359 | 1318 | 1356 | 1344 | 1.70% | 142.2% |
| Acrolein | 1073 | 998 | 1034 | 1035 | 3.62% | 103.4% |
| Acetaldehyde | 997 | 1014 | 995 | 1002 | 1.04% | 100.8% |
| 2-Furaldehyde | 1074 | 1142 | 1149 | 1122 | 3.69% | 121.6% |
| Ethanol | 1043 | 1042 | 1017 | 1034 | 1.42% | 109.8% |
| Ethyl acetate | 1140 | 1103 | 1124 | 1122 | 1.65% | 104.3% |
| 3-Methyl-1-butanol | 980 | 986 | 1006 | 991 | 1.37% | 102.5% |
| THF Internal Stancard - Lab Instrument | | | | | | |
| Tetrahydrofuran | 4929 | 5021 | 5072 | 5007 | 1.45% | 101.1% |
| Ethanol Plant Calibration Standard - Field Instrument | | | | | | |
| Methanol | 1135 | 1172 | 1156 | 1154 | 1.61% | 122.1% |
| Acrolein | 779 | 796 | 760 | 778 | 2.31% | 77.7% |
| Acetaldehyde | 958 | 901 | 907 | 922 | 3.40% | 92.7% |
| 2-Furaldehyde | 912 | 935 | 965 | 937 | 2.84% | 101.6% |
| Ethanol | 988 | 1026 | 975 | 996 | 2.66% | 105.8% |
| Ethyl acetate | 991 | 1002 | 968 | 987 | 1.76% | 91.7% |
| 3-Methyl-1-butanol | 859 | 912 | 897 | 889 | 3.07% | 92.0% |
| THF Internal Standard - Field Instrument | | | | | | |
| Tetrahydrofuran | 5406 | 5212 | 5343 | 5320 | 1.86% | 107.4% |

Some of the general observations and conclusions based on the experimental work described herein are listed below.

Liquid samples can be collected using a cryo trap and excellent percent recoveries can be achieved on water soluble reactive analytes like those found in RTOs from ethanol plants if analyzed immediately.

Large water samples on the order of 100 μL samples can be directly injected into the MAX GC-FTIR with excellent chromatography and results.

THF was found to be an excellent choice for a tracer material to determine the sample volume collected and to determine the dilution ratio for the spiked samples.

The actual samples concentrations can be back calculated based on the water concentration in the raw stream, if measured during sampling.

MDLs of less than 0.2 ppmv can be obtained for all the key water-soluble HAPs in this highly concentrated water sample. This reduces the FTIR detection limit by a factor of 10 or more for most of these compounds.

Percent (%) recovery results were strongly affected by shipment and delay of analyzing them. Especially acrolein as it is known to be somewhat reactive.

If liquid aqueous based samples are collected, direct analysis in the field is important.

Formaldehyde, formic acid and acetic acid can be obtained by direct FTIR gas analysis, so that all the important HAPs can be identified and quantified.

While this invention has been particularly shown and described with references to preferred embodiments thereof, it will be understood by those skilled in the art that various changes in form and details may be made therein without departing from the scope of the invention encompassed by the appended claims.

What is claimed is:

1. A sample analysis method, comprising:

vaporizing water and analytes present in a sample, wherein the water is present in the sample in an amount of at least 99 volume percent;

condensing the water upstream of a temporally-resolving separator to produce a water-depleted vapor component; and passing the water-depleted vapor component through the temporally-resolving separator, thereby resolving in time analytes present in the water-depleted vapor component.

2. The sample analysis method according to claim 1, further comprising analyzing the time-resolved analytes by optical spectrometry.

3. The sample analysis method according to claim 1, further comprising analyzing the time-resolved analytes by mass spectrometry.

4. The sample analysis method of claim 1, further comprising evacuating the condensed water vapors.

5. The sample analysis method of claim 1, wherein the sample is provided by direct injection and without sample splitting.

6. The sample analysis method of claim 1, wherein the water vapor is condensed in a transfer line upstream of the temporally-resolving separator.

7. The sample analysis method of claim 1, wherein the temporally-resolving separator is a GC column.

8. The sample analysis method according to claim 1, further comprising analyzing the time-resolved analytes by Fourier transform infrared spectrometry.

9. The sample analysis method of claim 1, further comprising a controller controlling a temperature of an injection port for the vaporizing of the water and controlling a temperature of a transfer line for the condensing of the water.

10. A sample analysis method, comprising:

vaporizing a sample containing water and analytes from a thermal desorption tube or a cryo-trap;

condensing water vapors upstream of a temporally-resolving separator to produce a water-depleted vapor component; and passing the water-depleted vapor component through the temporally-resolving separator, thereby resolving in time analytes present in the water-depleted vapor component.

11. The sample analysis method of claim 10, wherein the method does not employ a secondary thermal desorption tube.

12. The sample analysis method of claim 10, further comprising a mass spectrometry or an optical spectrometry analyzer.

13. The sample analysis method of claim 10, further comprising a controller controlling a temperature of an injection port for the vaporizing of the water and controlling a temperature of a transfer line for the condensing of the water.

14. A sample analysis system, comprising:

an injection port;

a temporally-resolving separator; and a conduit connecting the injection port and the temporally-resolving separator, wherein, the injection port is at a temperature sufficiently high to vaporize water and analytes present in a sample; and the conduit is configured to condense the water and maintain the analytes in the vapor phase producing a water-depleted vapor component.

15. The sample analysis system of claim 14, wherein the temporally-resolving separator is a GC column.

16. The sample analysis system of claim 14, further comprising an arrangement for cooling the conduit and detecting a temperature of the conduit and heating the injection port and/or detecting a temperature of the injection port.

17. The sample analysis system of claim 14, further comprising an arrangement for removing the condensed water from an interior of the conduit.

18. The sample analysis system of claim 14, wherein the conduit includes one or more changes in cross section.

19. The sample analysis system of claim 14, further comprising a mass spectrometry analyzer.

20. The sample analysis system of claim 14, further comprising an optical spectrometry analyzer.

21. The sample analysis system of claim 14, further comprising a controller.

22. The sample analysis system of claim 14, further comprising a controller for controlling a temperature of the injection port by driving an injection port heater and monitoring an injection port temperature detector, the controller also controlling a transfer line heating and cooling system and using a transfer line temperature detector to detect a temperature of the transfer line.

23. A sample analysis system, comprising:

a thermal desorption tube or a cryo-trap;

a conduit for passing vapors from the thermal desorption tube or the cryo-trap to a temporally-resolving separator, wherein, the conduit is configured to condense water and maintain the analytes in the vapor phase producing a water-depleted vapor component.

24. The sample analysis system of claim 23, wherein the system does not employ a secondary thermal desorption tube.

25. The sample analysis system of claim 23, further comprising a mass spectrometry or an optical spectrometry analyzer.

26. The sample analysis system of claim 23, further comprising a controller for controlling a temperature of the injection port by driving an injection port heater and monitoring an injection port temperature detector, the controller also controlling a transfer line heating and cooling system and using a transfer line temperature detector to detect a temperature of the transfer line.

* * * * *

UNITED STATES PATENT AND TRADEMARK OFFICE

CERTIFICATE OF CORRECTION

PATENT NO. : 11,215,590 B2
APPLICATION NO. : 16/115732
DATED : January 4, 2022
INVENTOR(S) : McPartland et al.

It is certified that error appears in the above-identified patent and that said Letters Patent is hereby corrected as shown below:

In the Claims

In Claim 16, Column 20, Line 66, delete "injection port and/or detecting a temperature of the injection" and insert -- injection port and detecting a temperature of the injection --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*